United States Patent
Bryskin et al.

(10) Patent No.: US 9,391,923 B2
(45) Date of Patent: Jul. 12, 2016

(54) USING PATH COMPUTATION ELEMENT COMMUNICATION PROTOCOL (PCEP) AS A SIGNALLING PROTOCOL DURING DYNAMIC SERVICE PROVISION IN NETWORKS

(71) Applicant: ADVA Optical Networking SE, Meiningen (DE)

(72) Inventors: Igor Bryskin, Great Falls, VA (US); Vishnu Pavan Beeram, Ashburn, VA (US)

(73) Assignee: ADVA OPTICAL NETWORKING SE, Meiningen (DE)

(*) Notice: Subject to any disclaimer, the term of this patent is extended or adjusted under 35 U.S.C. 154(b) by 37 days.

(21) Appl. No.: 13/826,142

(22) Filed: Mar. 14, 2013

(65) Prior Publication Data
US 2013/0279514 A1 Oct. 24, 2013

Related U.S. Application Data

(60) Provisional application No. 61/637,840, filed on Apr. 24, 2012.

(51) Int. Cl.
| | |
|---|---|
| *H04L 12/70* | (2013.01) |
| *H04L 12/911* | (2013.01) |
| *H04L 12/24* | (2006.01) |
| *H04L 12/751* | (2013.01) |
| *H04L 12/721* | (2013.01) |
| *H04L 12/717* | (2013.01) |
| *H04L 12/26* | (2006.01) |
| *H04L 12/723* | (2013.01) |

(52) U.S. Cl.
CPC .............. *H04L 47/829* (2013.01); *H04L 41/04* (2013.01); *H04L 41/5077* (2013.01); *H04L 45/10* (2013.01); *H04L 45/42* (2013.01); *H04L 45/44* (2013.01); *H04L 43/0811* (2013.01); *H04L 45/50* (2013.01); *H04L 45/62* (2013.01)

(58) Field of Classification Search
None
See application file for complete search history.

(56) References Cited

U.S. PATENT DOCUMENTS

| 6,785,731 B1 * | 8/2004 | Westberg et al. .............. 709/232 |
| 2010/0232316 A1 | 9/2010 | Takacs |

FOREIGN PATENT DOCUMENTS

| EP | 2 009 848 A1 | 12/2008 |
| WO | WO 00/72550 A1 | 11/2000 |

OTHER PUBLICATIONS

Extended European Search Report for European Patent Application No. 13163388.5 (Jul. 31, 2013).

Vasseur et al., "Path Computation Element (PCE) Communication Protocol (PCEP)," Network Working Group, RFC 5440, pp. 1-87 (Mar. 2009).

(Continued)

*Primary Examiner* — Christopher Crutchfield
*Assistant Examiner* — Alan Lindenbaum
(74) *Attorney, Agent, or Firm* — Jenkins, Wilson, Taylor & Hunt, P.A.

(57) ABSTRACT

The subject matter described herein includes using a path computation element communication protocol (PCEP) as a signaling protocol during dynamic service provisioning in networks. According to one aspect of the subject matter described herein, a network uses a hard state point-to-point protocol as a signaling protocol during dynamic service provisioning in a control plane of the network. In one implementation, the point-to-point protocol is a path computation element communication protocol (PCEP).

4 Claims, 2 Drawing Sheets

(56) References Cited

OTHER PUBLICATIONS

Farrel et al., "A Path Computation Element (PCE)-Based Architecture," Network Working Group, RFC 4655, pp. 1-40 (Aug. 2006).
Berger, "Generalized Multi-Protocol Label Switching (GMPLS) Signaling Resource ReserVation Protocol-Traffic Engineering (RSVP-TE) Extensions," Network Working Group, RFC 3473, pp. 1-42 (Jan. 2003).
Awduche et al., "RSVP-TE: Extensions to RSVP for LSP Tunnels," Network Working Group, RFC 3209, pp. 1-61 (Dec. 2001).
Braden et al., "Resource ReSerVation Protocol (RSVP)—Version 1 Functional Specification," Network Working Group, RFC 2205, pp. 1-112 (Sep. 1997).

* cited by examiner

RSVP SIGNALING/PROVISIONING PATTERNS

1a. ONE-WAY END TO END (HOP BY HOP): MESSAGES SENT FROM INGRESS TO EGRESS

1b. TWO-WAY END TO END (HOP BY HOP): MESSAGES SENT FROM INGRESS TO EGRESS
AND FROM EGRESS TO INGRESS

SIGNALING/PROVISIONING PATTERNS NOT SUPPORTED BY RSVP

2a. END TO END (HOP BY HOP): MESSAGES SENT FROM EGRESS TO INGRESS

2b. TRANSIT TO EITHER END (HOP BY HOP): MESSAGES SENT FROM TRANSIT TO INGRESS AND EGRESS

2c. SIGNALING SCOPED TO A PATH SEGMENT

2d. SIGNALING SCOPED TO AN ARBITRARY SUBSET OF SERVICE NODES

2e. STAR 'N SPOKE PARADIGM

USING PATH COMPUTATION ELEMENT COMMUNICATION PROTOCOL (PCEP) AS A SIGNALLING PROTOCOL DURING DYNAMIC SERVICE PROVISION IN NETWORKS

PRIORITY CLAIM

This application claims the benefit of U.S. Provisional Patent Application Ser. No. 61/637,840, filed Apr. 24, 2012; the disclosure of which is incorporated herein by reference in its entirety.

TECHNICAL BACKGROUND

One important aspect of dynamic provisioning of services on transport networks is signaling of service specific policies and parameters along the path(s), taken by the services.

Currently the GMPLS RSVP-TE protocol (RFC3473) is widely deployed in GMPLS controlled transport networks. The main reason why the said protocol is practically the only choice for GMPLS signaling protocol is because it is derived from the RSVP-TE protocol (RFC3209, RFC2205), which is deployed with great success in IP/MPLS networks in the last 10-12 years. This level of success could be largely credited to the soft state nature of the protocol.

In a nutshell, a soft state signaling protocol requires maintaining of a protocol state for each service on each network interface used by the service. The said state contains all service configuration information and thus fully reflects the current state of the service in the data plane on the interface in question (i.e. network resources currently used by the service, how the resources are configured and bound in cross-connects, etc.). Whenever a service modification is necessary, a new signaling update must be delivered to each service node, carrying full set of service parameters appropriately modified. The protocol software on each node is supposed to use the received information to update the protocol state associated with every interface used by the service, and reconfigure the interfaces accordingly. At the time when the service is not being modified, all nodes involved in the service, are supposed to send and receive periodic refreshes—signaling updates with unmodified content—to/from their respective neighbors. Such refreshes are meant to say that the service is still alive and functioning properly. The refreshes may be missed occasionally; however, if a configured number of subsequent refreshes are not received, this is supposed to be interpreted as the service either has been implicitly deleted or is not functioning. In this case the protocol states on all interfaces used by the service are supposed to be removed, and network resources released. Likewise, any unexpectedly received refresh is supposed to be interpreted as an implicit service setup or reroute, with protocol states and interface configurations are to be adjusted accordingly.

Soft state signaling protocol, such as RSVP-TE, works very well on IP/MPLS networks because of the following network characteristics:
  a) Large number of dynamic short-lived flows of traffic that change frequently their paths across the network;
  b) Network elements (IP routers) have congruent control and data planes (i.e. use the same network resources for transporting user traffic and control plane messages)

On such networks soft state signaling protocols provide reasonably reliable self-healing environments that respond equally well to frequently changing service paradigms and various network failures. For example, as soon as a network failure happens, the affected services will stop receiving signaling refreshes. In this case the services will be quickly released on the nodes affected by the failure and re-established shortly along the healthy paths (as soon as IP routing protocols converge, the services are routed away from the failure). In short, the IP/MPLS services, controlled by a soft state signaling protocol, are self-healing and adoptive when affected by network failures and/or network re-configurations, and they self-destroy cleanly and reliably when they are not needed any longer.

Circuit-switched transport networks, however, have very different characteristics compared to IP/MPLS networks. Transport network service placement, re-placement, protection against and restoration after failures need to be tightly controlled. Normally, once set, the services are rarely modified. Importantly, because of non-congruency of the control and data planes of network elements making up transport networks, it cannot be assumed that if a service is disturbed in control plane, it is dysfunctional. In other words, a service may carry user traffic even when the control plane communication between network elements involved in the service is broken. For example, missed signaling refreshes for a given service mean disturbance in the control plane with respect to the service. However, releasing the service just because of the missed refreshes may hit unjustifiably perfectly healthy user traffic flows. So, on the one hand, in sharp contrast to IP/MPLS networks, the soft state nature of a signaling protocol gives no advantages. On the other hand, the price for using a soft state protocol, such as GMPLS RSVP-TE still needs to be paid, which is extremely high in terms of:
  a) Memory: RSVP based protocols are notoriously known for huge protocol states, which in case of GMPLS RSVP-TE could be as high as 15Kbyte per state;
  b) Bandwidth in DCN (Data Communication Network—a separate IP network used for control and management plane communication between transport network elements and NMS). The scarce DCN resources are consumed by the protocol updates (even at times when the services do not experience any changes);
  c) Network element CPU consumed on generating and processing of the large and semantically complex protocol updates (even at times when the services do not experience any changes)

In addition to being unjustifiably expensive, RSVP-TE based protocols have other serious shortfalls: inflexible signaling paradigm, inability to function under condition of control plane connectivity disruption, inability to signal incremental and sequence critical modifications, lack of message flow control, etc.

There are only two ways to manipulate services (creating/modifying/deleting) using a conventional RSVP-TE based signaling protocol as illustrated in FIG. 1:
  a) One-way end to end: starting on service ingress node, then hop-by-hop to every transit node and finishing on the service egress node;
  b) Two-way end to end: starting on the ingress node, then hop-by-hop to every transit node, then reversing direction on egress node and going back hop-by-hop over all transit nodes and finishing on the ingress node.

When using a conventional RSVP-TE based signaling protocol it is impossible to realize many useful signaling patterns such as shown in FIG. 2, in particular:
  a) end to end from egress node hop-by-hop towards ingress node;
  b) start from a transit node in either or both directions;
  c) scope signaling to a path segment (as opposed to end-to end);
  d) scope signaling to an arbitrary subset of service nodes;

e) star-n-spoke paradigm (used by the management plane when the service provisioning is controlled by NMS): signal separately to each service node.

Further RSVP-TE is not able to handle control plane connectivity disruptions.

RSVP-TE based protocols function hop-by-hop. If one of the RSVP-TE controllers along a service path has stopped working for whatever reason, the signaling flow is disrupted, and the service becomes unmanageable (albeit remains functional in the data plane). For example, a RSVP-TE based protocol provides no clean way to tear down, modify or reroute a service without straying the network resources allocated for the service, when one of the RSVP-TE controllers along the service path has crashed because of a hardware failure or a software bug. This is a serious operational problem, exacerbated even further by the lack of a mechanism to notify the management plane (and eventually the user) about control plane connectivity problems.

Moreover RSVP-TE to is not able to signal incremental and/or sequence critical updates.

Because RSVP-TE service setup or modify message (Path message) must contain entire information about service (full control plane state), and because RSVP-TE messages could be occasionally lost even under normal—network failure free—conditions (due to unreliable IP datagram transport used by RSVP-TE), it is impossible to signal service changes in increments. Furthermore, for the same reasons and also because RSVP-TE does not mandate any order as to how the RSVP-TE objects should appear in the message, it is awkward to signal via RSVP-TE provisioning operations that require a certain sequence in which they must be performed.

There is also a lack of message flow control in RSVP-TE.

RSVP-TE based protocols do not have message flow control because of the IP datagram based transport used by RSVP-TE to propagate its messages along the service path. For example, the situation can arise when frequent service modifications signaled by a service ingress RSVP-TE controller overwhelms a slower neighboring transit node. Note that this problem does not exist when a protocol uses TCP based transport to distribute its messages. BGP and LDP are two popular examples of such protocol.

SUMMARY OF THE INVENTION

This invention proposes using a hard state point to point protocol such as the PCEP protocol (RFC5440), designed by IETF for the purpose of the communication between path computation clients and servers in the context of PCE Based Architecture (RFC4655) to be used as a signaling protocol for GMPLS controlled dynamic service provisioning on transport networks.

PCEP protocol is designed to allow for a RSVP-TE controller in the role of PCC (path computation client) to outsource the path selection function for a given service to a remote Path Computation Element (path computation server) instead of performing the path computation locally. Because the service configuration parameters could serve as path computation constraints and/or optimization criterions, they need to be signaled to the PCE. Also, the resulting paths produced by the PCE must be signaled back to requester (in this case, the RSVP-TE controller) in the format of the ready to be signaled RSVP-TE Explicit Route Objects. This means that semantics and encoding of the PCEP signaling objects is similar (often identical) to the semantics and encoding of RSVP-TE signaling objects. Considering that and also the fact that PCEP is easily extendable when/if new objects are needed to be introduced, the switching to using the PCEP instead of RSVP-TE as a signaling protocol should be a relatively fast and easy process.

PCEP is a hard state protocol based on a reliable TCP transport. It does save the expenses of a soft state protocol. In particular, the PCEP protocol state is much smaller than the RSVP-TE protocol state, it only contains service configuration information that needs to be applied to the service interfaces at the moment, rather than entire information about the service (as is in the case with the RSVP-TE protocol). Nor PCEP requires any state duplications necessary to maintain soft states (for example, such duplications are required to distinguish refreshes from service modification messages).

In case of PCEP neither DCN bandwidth nor network element CPU time is wasted on generating, distributing and processing of protocol refreshes.

Figure 1:
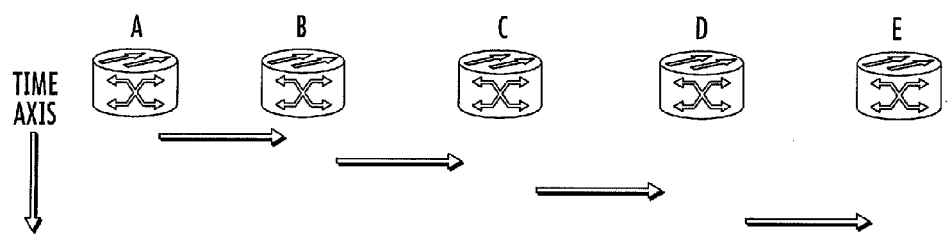
FIG. 1a is a network diagram illustrating one way end-to-end (hop-by-hop) RSVP signaling where messages are sent from the ingress to the egress router.
FIG. 1b is a network diagram illustrating two way end-to-end (hop-by-hop) RSVP signaling where messages are sent from an ingress router to an egress router and from the egress router to the ingress router.
Figure 1:
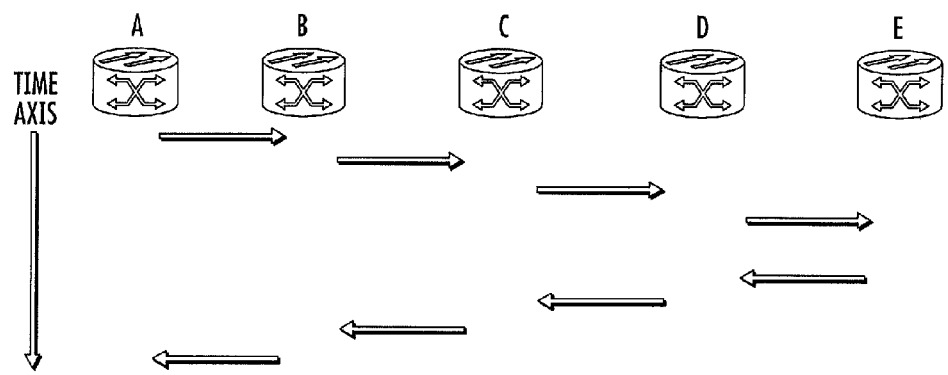
Figure 2:
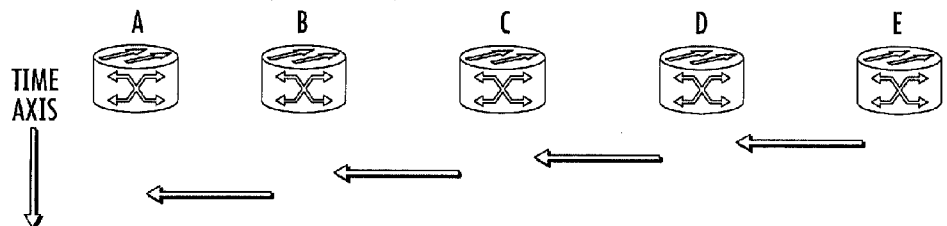
FIG. 2a is a network diagram illustrating end-to-end (hop-by-hop) signaling patterns not supported by RSVP where messages are sent from an egress router to an ingress router.
FIG. 2b is a network diagram illustrating transit to end-to-end (hop-by-hop) signaling/provisioning patterns not supported by RSVP where messages are sent from transit to ingress and egress routers.
FIG. 2c is a network diagram illustrating signaling/provisioning patterns not supported by RSVP where signaling is scoped to a path segment.
FIG. 2d is a network diagram illustrating a signaling/provisioning pattern not supported by RSVP where signaling is scoped to an arbitrary subset of service nodes.
FIG. 2e is a network diagram illustrating signaling/provisioning patterns not supported by RSVP where the pattern includes a star and spoke paradigm.
Figure 2:
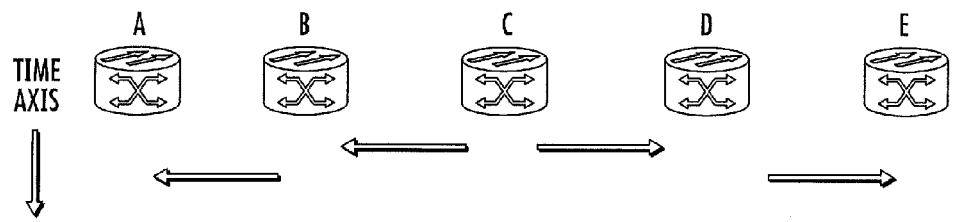
Figure 2:
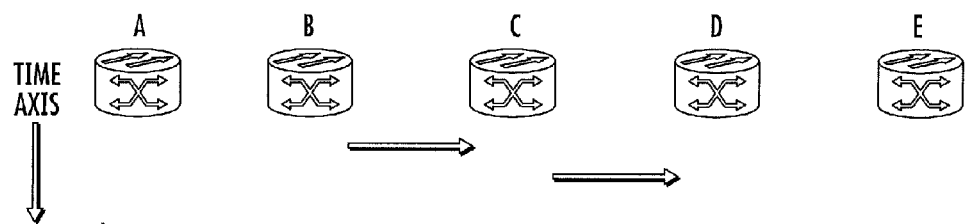
Figure 2:
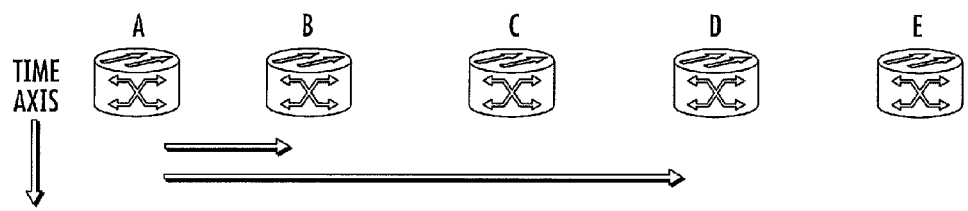
Figure 2:
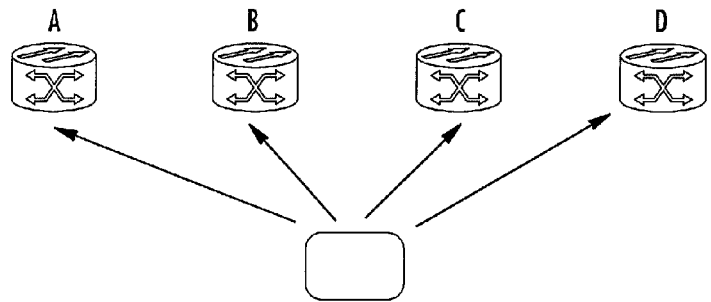

PCEP is a point-to-point rather than hop-by-hop protocol, and as such, allows for all signaling patterns shown in FIG. 2, including the start-n-spoke paradigm (when a single entity, such as NMS, signals the service configuration parameters to each network element individually and in an arbitrary order). This makes possible to use PCEP not only as a signaling protocol in control plane solutions, but also as a management protocol in pure management plane and/or mixed (control and management plane) solutions. For the same reason, PCEP can cope with control plane connectivity disruptions much better than a RSVP-TE based protocol. In particular, with PCEP it is possible to signal service release, modification, reroute, etc. requests around temporarily non-responsive controllers, thus making services disrupted in control plane still manageable.

As a hard state reliable protocol PCEP does allow service (re-) configurations incrementally, with each incremental service modification being signaled in a separate message. For the same reason the sequence critical operations (e.g. per-channel power equalization performed after a WDM layer network tunnel is set up or torn down) present no problem when controlled by PCEP, because the operations could be signaled in separate messages issued and processed in a required order.

Finally, as a TCP based protocol PCEP inherently provides a message flow control for its speakers. Specifically, if one of them issues signaling updates at a rate that a recipient of the updates is not able to process, the situation is quickly detected and the "chatty" speaker is slowed down to an acceptable rate.

The invention claimed is:

1. A network, comprising:
a network element comprising a control plane;
a management plane;
a path computation client (PCC); and
a remote path computation element (PCE);
wherein a hard state point-to-point protocol is used as a management protocol to communicate management messages in the management plane, wherein the management messages contain service configuration parameters to be dynamically applied to a service interface of the network element for generalized multi-protocol label switching (GMPLS) controlled dynamic service provisioning in said control plane of said network element;
wherein said hard state point-to-point protocol comprises a PCE communication protocol (PCEP) by which the PCC communicates the service configuration parameters to the remote PCE for outsourcing a path selection function to the remote PCE;
wherein said PCEP protocol allows the service configuration parameters to be signaled to the PCE, and paths produced by the PCE to be signaled back to the PCC;
wherein the PCEP protocol is used as a signaling protocol to signal one or more service release requests, service modification requests, or service reroute requests around non-responsive controllers of nodes using the PCEP protocol as a signaling protocol; and
wherein the network is adapted to perform service management of services according to service provisioning signaling patterns comprising:
a one-way end to end pattern starting on a service ingress node via transit nodes to a service egress node;
a two way end to end pattern starting on a service ingress node via transit nodes to a service egress node and then back in reverse direction via the transit nodes to the service ingress node;
a one-way end to end pattern starting from a service egress node via transit nodes to a service ingress node;
a two way pattern starting from a transit node in either or both directions via transit nodes to a service ingress node and/or service egress node;
a pattern wherein signaling is scoped to a path segment;
a pattern wherein signaling is scoped to an arbitrary subset of nodes; and
a star-n-spoke pattern;
wherein a single entity signals service configuration parameters to each node individually and in an arbitrary order.

2. The network according to claim 1, wherein a plurality of service reconfigurations are performed incrementally in said network, with each incremental service modification signaled in a separate message.

3. The network according to claim 1, wherein said network is a circuit-switched transport network.

4. A method for dynamic service provisioning in a network, said network comprising a control plane, a management plane, a path computation client (PCC) and a remote path computation element (PCE), the method comprising:
communicating management messages in the management plane using a hard state point-to-point protocol as a management protocol, wherein the management messages contain service configuration parameters to be dynamically applied to a service interface of the network element for generalized multi-protocol label switching (GMPLS) controlled dynamic service provisioning in the control plane of said network, wherein said hard state point-to-point protocol comprises a PCE communication protocol (PCEP);
outsourcing, by said PCC, a path selection function to said remote PCE upon signaling the service configuration parameters to the remote PCE using the PCEP protocol as a signaling protocol;
signaling the service configuration parameters to said PCE;
signaling back paths produced by PCE to said PCC;
signaling one or more service release requests, service modification requests, or service reroute requests around non-responsive controllers of nodes using the PCEP protocol as a signaling protocol; and
managing services according to service provisioning signaling patterns comprising:
a one-way end to end pattern starting on a service ingress node via transit nodes to a service egress node;
a two way end to end pattern starting on a service ingress node via transit nodes to a service egress node and then back in reverse direction via the transit nodes to the service ingress node;
a one-way end to end pattern starting from a service egress node via transit nodes to a service ingress node;
a two way pattern starting from a transit node in either or both directions via transit nodes to a service ingress node and/or service egress node;
a pattern wherein signaling is scoped to a path segment;
a pattern wherein signaling is scoped to an arbitrary subset of nodes; and
a star-n-spoke pattern;
wherein a single entity signals service configuration parameters to each node individually and in an arbitrary order.

* * * * *